US011127101B2

(12) United States Patent
Nakamura

(10) Patent No.: US 11,127,101 B2
(45) Date of Patent: Sep. 21, 2021

(54) TAXI DISPATCH CONTROL SYSTEM AND METHOD FOR TAXI DISPATCHING

(71) Applicant: Kazuto Nakamura, Osaka (JP)

(72) Inventor: Kazuto Nakamura, Osaka (JP)

(73) Assignee: Kazuto Nakamura, Osaka (JP)

( * ) Notice: Subject to any disclaimer, the term of this patent is extended or adjusted under 35 U.S.C. 154(b) by 439 days.

(21) Appl. No.: 16/010,035

(22) Filed: Jun. 15, 2018

(65) Prior Publication Data

US 2019/0304043 A1 Oct. 3, 2019

(30) Foreign Application Priority Data

Mar. 29, 2018 (JP) .............................. JP2018-064537

(51) Int. Cl.
| | |
|---|---|
| *G06Q 10/04* | (2012.01) |
| *G06Q 50/30* | (2012.01) |
| *G06Q 10/10* | (2012.01) |
| *G07C 1/10* | (2006.01) |
| *G08G 1/00* | (2006.01) |
| *G06Q 10/02* | (2012.01) |

(52) U.S. Cl.
CPC ............ *G06Q 50/30* (2013.01); *G06Q 10/02* (2013.01); *G06Q 10/103* (2013.01); *G07C 1/10* (2013.01); *G08G 1/202* (2013.01)

(58) Field of Classification Search
CPC .. G05B 13/024; G05B 13/0265; G06Q 10/04; G06Q 10/06; Y02P 90/82
USPC ............. 1/1; 700/99, 28, 36; 705/7.12, 7.11, 705/7.13, 13
See application file for complete search history.

(56) References Cited

U.S. PATENT DOCUMENTS

| | | | |
|---|---|---|---|
| 8,554,608 B1 | 10/2013 | O'Connor | |
| 2002/0087534 A1* | 7/2002 | Blackman | ............... G06Q 10/10 |

(Continued)

FOREIGN PATENT DOCUMENTS

JP 2017-204042 A 11/2017

OTHER PUBLICATIONS

Jung, Jaeyoung, R Jayakrishnan, and Ji Young Park. "Dynamic Shared-Taxi Dispatch Algorithm with Hybrid-Simulated Annealing." Computer-aided civil and infrastructure engineering 31.4 (2016): 275-291. Web. (Year: 2016).*

(Continued)

*Primary Examiner* — Akiba K Robinson
(74) *Attorney, Agent, or Firm* — Leason Ellis LLP

(57) ABSTRACT

In a taxi dispatch control system and method for taxi dispatching, the system comprising customer terminal, driver's terminal, and a management server owned by a taxi managing company. The customer terminal sends a dispatch request to the management server (S1), the management server creates a passenger information list not dispatching based on the dispatch request from the customer terminal (S2). The driver's terminal which the driver worker signed accession to the taxi dispatch service can browse the passenger information list not dispatching. After browse the passenger information list not dispatching, driver worker can send a notice of wish to pick up customer as a will indication from the driver's terminal (S9). The driver worker can work by receiving dispatch requests at their own convenient time and reduce the useless waiting time of driver worker.

2 Claims, 6 Drawing Sheets

(56) References Cited

U.S. PATENT DOCUMENTS

| | | | | |
|---|---|---|---|---|
| 2003/0144793 A1* | 7/2003 | Melaku | ............... | G01C 21/206 |
| | | | | 701/434 |
| 2011/0000747 A1* | 1/2011 | Wu | ...................... | G06Q 10/04 |
| | | | | 187/383 |
| 2013/0060585 A1* | 3/2013 | Hornbaker | ............ | G06Q 10/02 |
| | | | | 705/5 |
| 2015/0193778 A1* | 7/2015 | Meyer | .................. | G06Q 10/083 |
| | | | | 705/304 |
| 2018/0109935 A1* | 4/2018 | Truong | ............... | G01C 21/005 |
| 2019/0197437 A1* | 6/2019 | Wang | .................... | G06Q 10/08 |
| 2020/0074574 A1* | 3/2020 | Djuric | .................... | G06Q 50/30 |

OTHER PUBLICATIONS

Zhang, Lingyu et al. "A Taxi Order Dispatch Model Based On Combinatorial Optimization." Proceedings of the 23rd ACM SIGKDD International Conference on Knowledge Discovery and Data Mining. ACM, 2017. 2151-2159. Web. (Year: 2017).*

Npl search history (Year: 2021).*

* cited by examiner

FIG. 3A
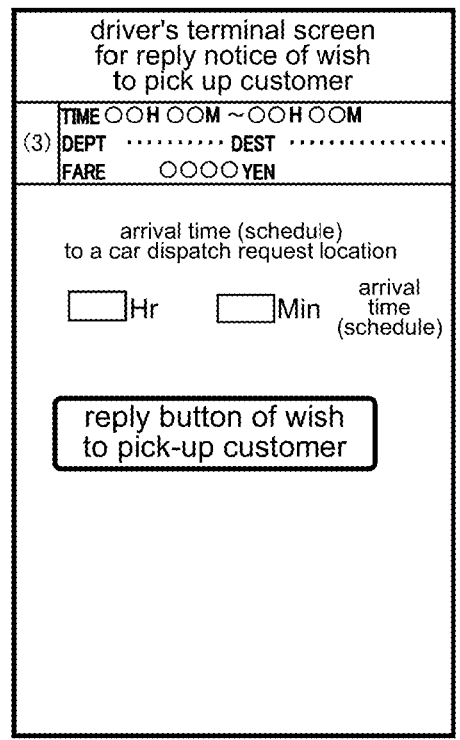
FIG. 3B
FIG. 4
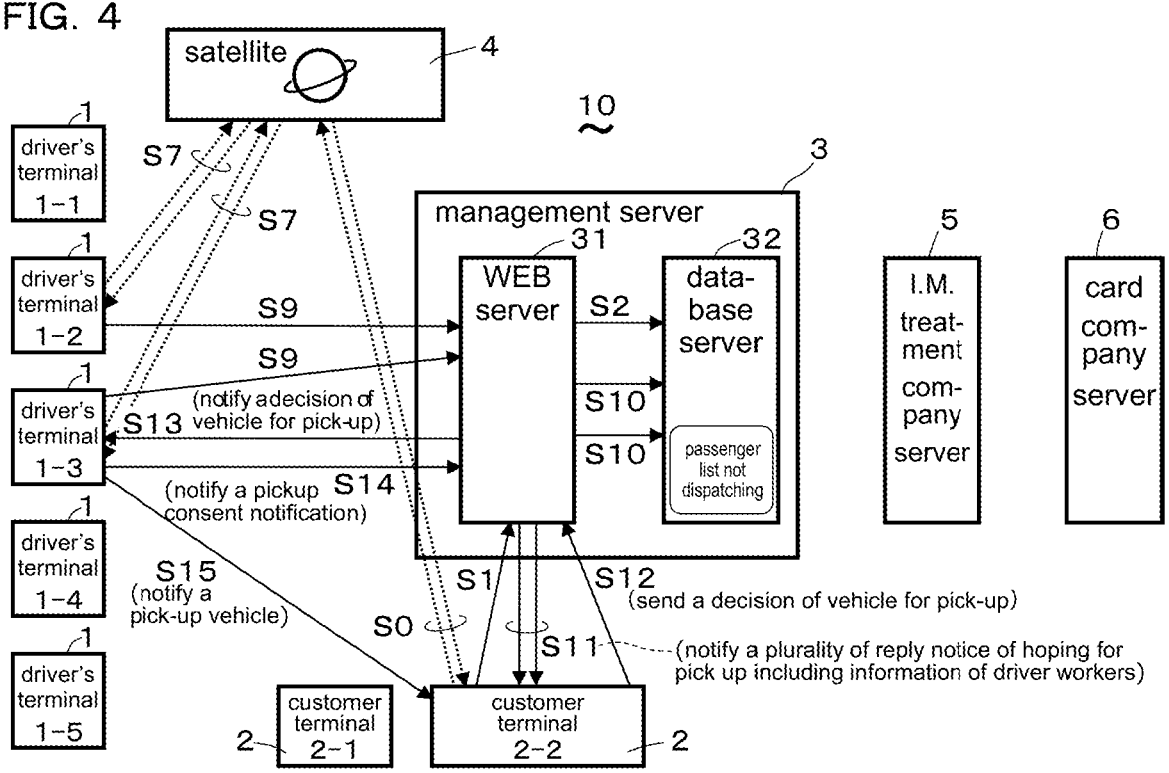

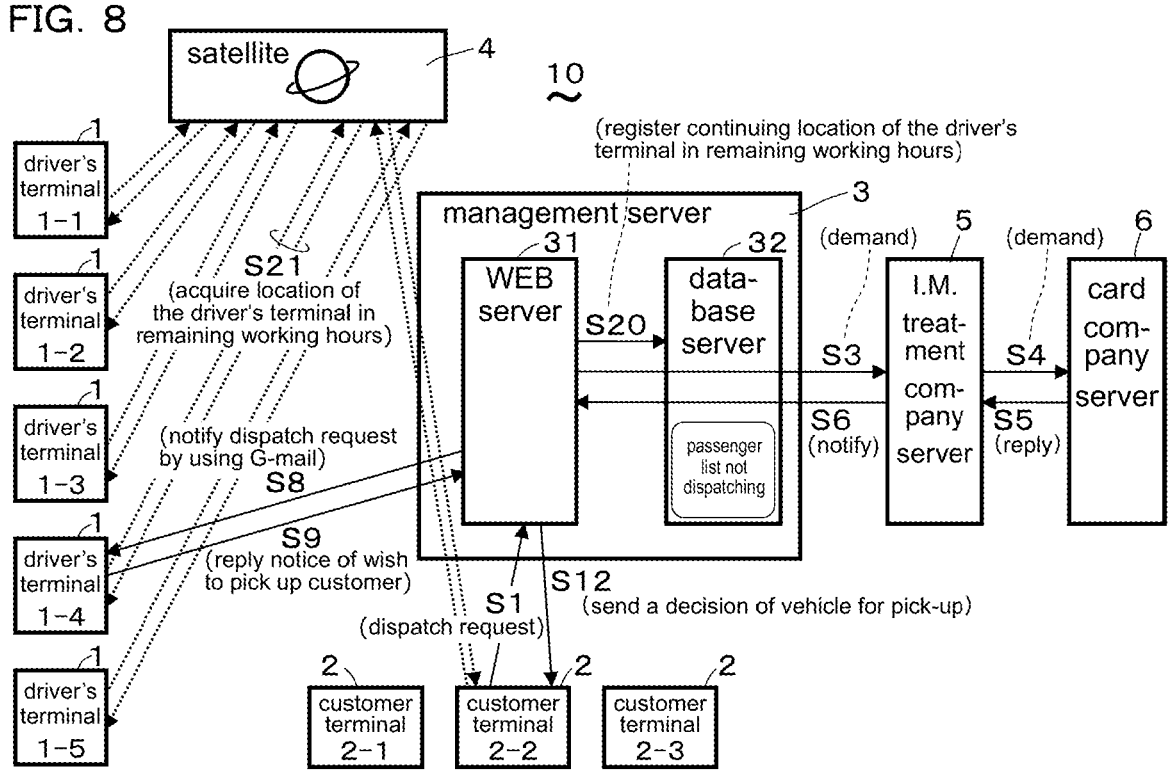

FIG. 9A

- from [departure place]
- to [destination place]

☐ ride together  ☐ female driver fare rank
A☐  B☐  C☐

[search]

fare  ¥0,000yen

☐ 30min~45min later
☐ 45min~60min later
☐ 60min~90min later

☐ immediately

[register]

FIG. 9B

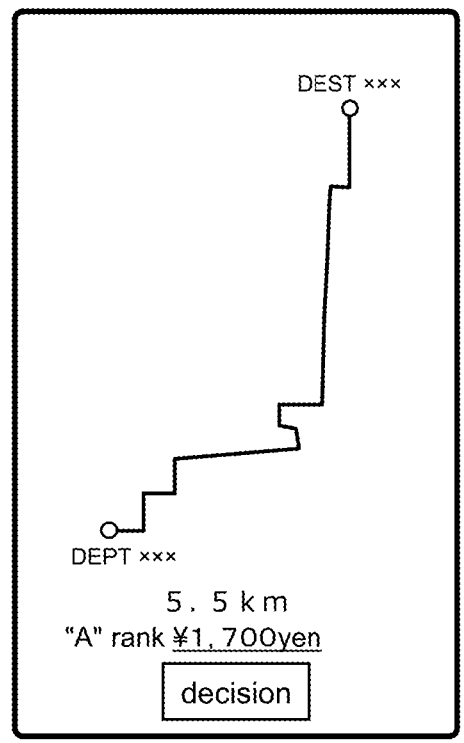

DEST ×××

DEPT ×××

5.5km
"A" rank ¥1,700yen

[decision]

FIG. 9C

- from [××××××××]
- to [××××××××]

☐ ride together  ☐ female driver fare rank
A☐  B☐  C☐

[search]

fare  ¥1,700yen

☑ 30min~45min later
☐ 45min~60min later
☐ 60min~90min later

☐ immediately

[register]

FIG. 10A

- from [departure place]
- to [destination place]

[✓] ride together  [ ] female driver fare rank
A [ ]  B [ ]  C [ ]

[search]

fare  ¥ O,OOO yen

[ ] 30min~45min later
[ ] 45min~60min later
[ ] 60min~90min later

[ ] immediately

[register]

FIG. 10B wish to pick-up time (today)

from [ ]H [ ]M
by   [ ]H [ ]M number of ride together people  [ ]

dest ×××
dept ×××

- distance  25km
- transport fare uncertain

[decision]

FIG. 10C confirmation terminal screen

DEPT · · · · ·
DEST · · · · · distance  25 km wish to pick-up time (today)

from [ ]H [ ]M
by   [ ]H [ ]M number of ride together people  [ ]

[register]

TAXI DISPATCH CONTROL SYSTEM AND METHOD FOR TAXI DISPATCHING

This application claims the benefit of Japanese Patent Application No. 2018-064537 filed Mar. 29, 2018, which is incorporated herein by reference in its entirety.

FILED OF THE INVENTION

The present invention relates to a taxi dispatch control system and a method for taxi dispatching which can properly manage working hours of driver worker.

BACK GROUND OF THE INVENTION

Conventionally, a taxi dispatch management system has been known in which driver worker join an application provided by a taxi managing company, and a driver worker picks up a Taxi dispatch request from a customer (see, for example, Japanese Unexamined Patent Application Publication No. 2017-204042).

Since this taxi dispatch management system simplifies the programming design of the application to reduce the cost, it is regarded as a system that other taxi driver worker can register and join as an application user of the application at low cost.

By the way, due to the diversity of modern working methods, there is a demand for personal driver worker who wish to work in taxi driving work in an allowable time zone in their own lives while having other work different from taxi driving work. In response to this demand, it is considered that a ride sharing system using a vehicle with a white (nonbusiness) number different from that of a taxi business vehicle will be lifted in the near future.

In the dispatch system, the personal driver worker concludes an affiliation agreement with the application of the management server provided by the taxi managing company. Shipping fare (transportation fare) which the driver worker receives from the customer is determined before starting transport based on the distance from the departure place of the customer's ride share to the destination. That is, this shipping fare is not a fare using a conventional taxi meter but a fare corresponding to the transportation distance.

In such a dispatch system, when a management server of a taxi management company receives a pick-up car request from a customer terminal, the contracted business vehicle is directed to a pick-up car request destination. At that time, the management server registers the current position information of many contracted business vehicles using the GPS function so as to respond quickly to the request for car from an unspecified place, and the management server determines a business vehicle that is as close as possible to the requested destination as a vehicle to be dispatched. For this reason, many contracted business vehicles must wait in the anticipated request area with the application launched. For this reason, depending on the circumstances of the pick-up car request, a long standby state is forced, so that a so-called long restraint time is required.

Such a long constraint time is harsh for individual driver worker who also have work other than taxi driving business and is also worried from the viewpoint of safe transportation.

Also, since it is permitted to register location information of the terminal of the contracted driver worker's vehicle in business freely on the management server at the judgment of the driver worker, it is impossible to limit the working hours of the driver worker.

Therefore, if it is defined that all of the time, when the current location information of contracted driver worker's vehicle is registered on the management server, is constraint time or actual working hours, even though individual driver worker are practically at private rest time, it seems as if it appears pretend to be in constraint time waiting for pick-up car requested. As a result, the burden of taxi managing company which gives predetermined monetary compensation corresponding to actual working hours to individual driver worker also increases.

SUMMARY OF THE INVENTION

The present invention solves the above-mentioned problem, and an object of the present invention is to provide a taxi dispatch control system and a method for taxi dispatching, in which driver worker signed accession to the application provided by taxi managing company and driver worker pick up a taxi dispatch request from customer. In the taxi dispatch control system, driver worker can receive dispatch request in a convenient time zone to start his job and reduce useless waiting time of the driver worker.

In order to achieve the above object, the taxi dispatch control system of the present invention, comprising:
  a customer terminal owned by the customer that is connectable to a network;
  a driver's terminal mounted on a car driven by the driver worker that is connectable to the network; and
  a management server owned by a taxi managing company that manages the dispatch service to the customer terminal using a customer application and a driver application, that is connectable to the network;
  wherein the taxi dispatch control system,
  the customer terminal sends a dispatch request and location information thereof to the management server by operation of the customer, using the customer application downloaded from the management server,
  the management server creates a passenger information list not dispatching based on the received dispatch request from the customer terminal and receives a notice of wish to pick up customer sent from the driver's terminal by the driver worker who browse the passenger information list not dispatching, and
  the driver's terminal is configured so that the driver worker can browse the passenger information list not dispatching displayed on the driver's terminal screen by using the driver application downloaded from the management server providing the taxi dispatch service to be signed accession by the driver worker, and the driver worker can send the notice of wish to pick up customer as will of the driver worker after browsing the passenger information list not dispatching.

Method for taxi dispatching of the present invention, using a customer terminal owned by the customer that is connectable to a network, a driver's terminal mounted on a car driven by the driver worker that is connectable to the network, and a management server owned by a taxi managing company that manages the dispatch service to the customer terminal using a customer application and a driver application, that is connectable to the network,
  wherein the method comprising:
  sending a dispatch request and location information thereof to the management server from the customer terminal by operation of the customer, using the customer application downloaded from the management server;

creating a passenger information list not dispatching on the management server based on the received dispatch request from the customer terminal, and receiving a notice of wish to pick up customer sent from the driver's terminal by the driver worker who browse the passenger information list not dispatching; and making available for browsing the passenger information list not dispatching displayed on the driver's terminal screen by using the driver application downloaded from the management server providing the taxi dispatch service to be signed accession by the driver worker, and available for sending the notice of wish to pick up customer as will of the driver worker from the driver's terminal, after browsing the passenger information list not dispatching.

According to the taxi dispatch control system and method for taxi dispatching, a passenger information list not dispatching is created on the management server based on a dispatch request from the customer terminal. Then, driver worker can browse the passenger information list not dispatching displayed on the driver's terminal screen, and after browsing the list, he can send a notice of wish to pick up. Hence, driver worker while having a free leisure time, is possible to receive the dispatch request at his convenient time zone without impossibility and without preparing for receiving the dispatch request, therefore, useless constraint time can be reduced. In addition, the taxi managing company will only bear the compensation corresponding to the actual working hours of the driver worker, which is reasonable.

BRIEF DESCRIPTION OF THE DRAWINGS

FIG. 3A is a view showing a passenger information list not dispatching created by the management server in the taxi dispatch control system.

FIG. 3B is a view showing the driver's terminal screen when notifying a "reply notice of wish to pick up".

FIG. 4 is a view showing a processing operation when there is the "reply notice of wish to pick up" from a plurality of the driver's terminal in the taxi dispatch control system.

FIG. 7A is a view showing the customer terminal screen when being the "riding together dispatch request" from the customer terminal in the taxi dispatch control system.

FIG. 7B is a view showing a riding together dispatch information list which is created by the management server.

FIG. 8 is a view showing a processing operation among the management server, the driver's terminal, and other servers when an early hour dispatch requested from the customer terminal in the taxi dispatch control system.

FIGS. 9A, 9B and 9C are views showing transition of the customer terminal screen when the ordinal dispatch request is made in the taxi dispatch control system.

FIGS. 10A, 10B and 10C are views showing transition of the customer terminal screen when the "riding together dispatch request" are made in the taxi dispatch control system.

DETAILED DESCRIPTION OF THE INVENTION

Figure 1:
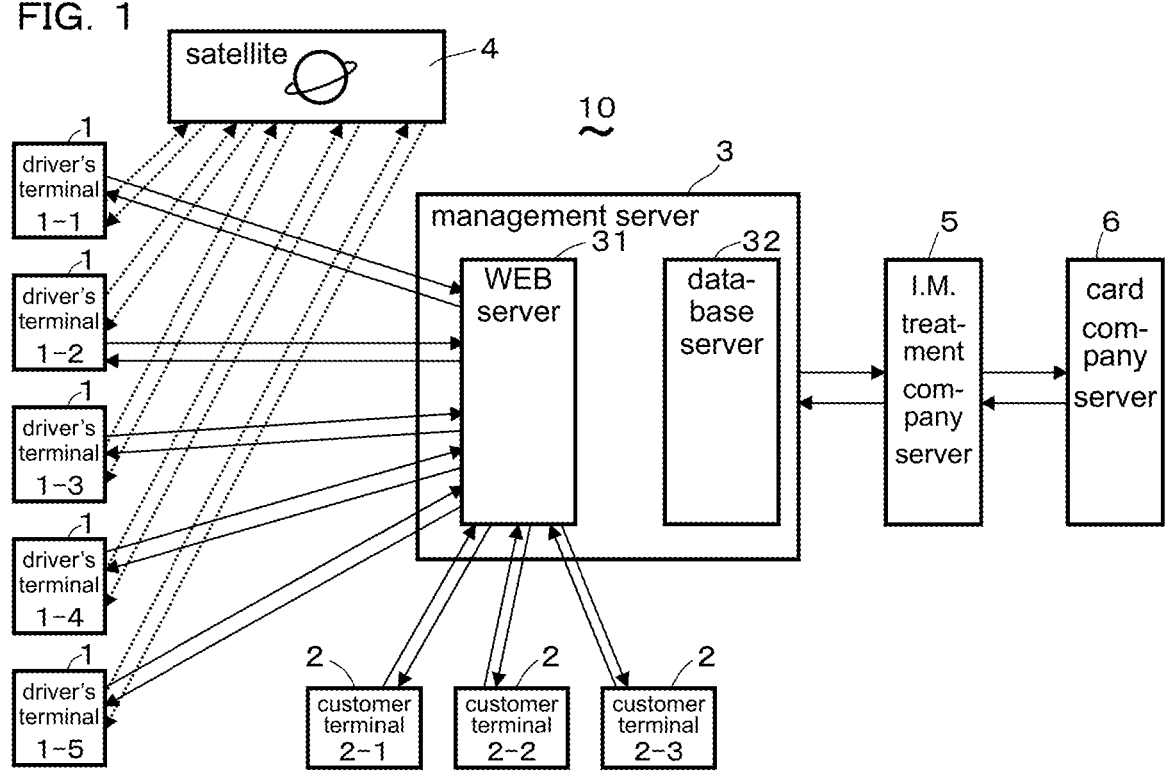
FIG. 1 is a view showing a configuration of a taxi dispatch control system according to one embodiment of the present invention, also Indicating an operation that customer terminals and a driver's terminals acquire respectively a customer application and a driver application from a management server of the taxi dispatch control system.

A taxi dispatch control system and method for taxi dispatching in accordance with one embodiment of the present invention is described with reference to Figures. In FIG. 1, a taxi dispatch control system 10 (system) comprising driver's terminal 1 (1-1, 1-2, 1-3, 1-4, 1-5) which is mounted on a car driven by driver worker, customer terminal 2 (2-1, 2-2, 2-3, 2-4, 2-5) owned by a plurality of customer, and a management server 3 owned by a taxi managing company. The driver's terminal 1 is for use a taxi dispatch processing. The management server 3 manages the dispatch service to the customer terminal 2 using a customer application and a driver application.

The driver's terminal 1, the customer terminal 2 and the management server 3 are respectively connectable to a network such as the Internet. The customer terminal 2 and the driver's terminal 1 have a GPS function obtained via satellite 4. The driver worker signed accession to the system offered by the taxi managing company can receive taxi dispatch request from the customer.

It may be possible that the system 10 offers card less settlement for payment of taxi (transport) fare in addition to the taxi dispatch. In such case, the management server 3 may connect to an intermediate treatment company server 5 and further the intermediate treatment company server 5 may connect to a Card Company server 6.

The management server 3 is under the control of taxi managing company which subjectively manages the system 10 and poses the customer application and the driver application. Driver workers wishes to pick up customer in response to a taxi dispatch request using the system 10 sign accession to a service offered by a taxi managing company and download the driver application to the driver's terminal 1 from the management server 3.

Customer wishes to receive the taxi dispatch using the system 10 access to a sight of the management server 3 and download the customer application to the customer terminal 2 from the sight. The management server 3 includes a WEB server 31 and a database server 32. The database server 32 stores passenger information that does not dispatch while there is a despite request, then creates a "passenger information list not dispatching". The driver's terminal 1 is configured so that the driver worker can browse the "passenger information list not dispatching" displayed on the driver's terminal screen by using the driver application downloaded from the management server 3 providing the taxi dispatch service to be signed accession by the driver worker, and the driver worker can send the notice of wish to pick up customer as will of the driver worker after browsing the "passenger information list not dispatching".

Mobile phone or smart phone may be used for the customer terminal 2. Smart phone or tablet may be used for the driver's terminal 1. Driver workers having the driver's terminal 1 are including those who work for taxi driving work while taking other duties The Card Company server 6 is under the control of one of a plurality of Card Company offering a credit card payment.

Customer is signed accession to any of a Card Company and has any of a credit card. While, it is no need for customer to carry the credit card when being settlement processed by the system.

Taxi managing company is signed accession to a plurality of Card Company. The intermediate treatment company server 5 is intervene among the customer terminal 2, the management server 3 and the Card Company server 6, stores card processing ID (identification) which is generated for link with a customer's card information received from the management server 3.

The intermediate treatment company server 5 transmits a customer's card information linked with the card processing ID to the Card Company server 6 when received information with customer's card processing ID send to the customer terminal 2 from the management server 3.

In the system 10, card-less settlement can be achieved as work of the customer application downloaded on the customer terminal 2, the driver application downloaded on the driver's terminal 1, and a program stored on the management server 3 and the intermediate treatment company server 5. The card-less settlement method by the system is without using cash, is achieved by running program. For the card less settlement method, reference is made to Japanese Patent Application No. 2018-37837 proposed by the present applicant, and a detailed description thereof will be omitted.

In the present system having the above basic configuration, the processing operation is described below. The operation is done by customer terminal 2 obtained the customer application, the driver's terminal 1 obtained the driver application, and the management server 3 stored a predetermined program. The customer application of the customer terminal 2 is downloaded from the management server 3 by a customer handling. By the customer handling, individual information (including telephone number) and card information of the customer are inputted to the customer terminal 2 and are sent to the management server 3. Thereafter, the management server 3 registers card information of the customer with card processing ID on the intermediate treatment company server 5. Also, the management server 3 stores customer individual information linked to the card processing ID.

Figure 2:
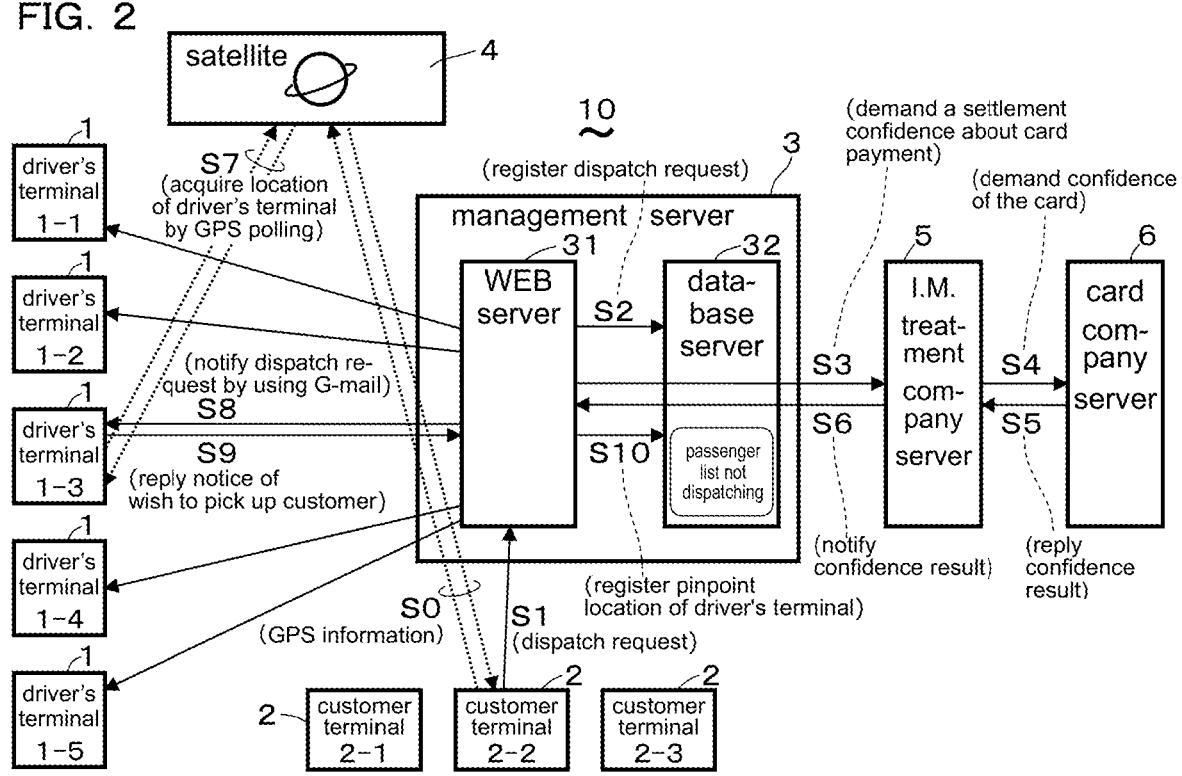
FIG. 2 is a view showing a processing operation among the management server, the driver's terminal, and other servers when an ordinal dispatch requested from the customer terminal in the taxi dispatch control system.

FIG. 2 shows a processing operation including a credit card payment between the management server 3, driver's terminal 1 and other server when being an ordinary dispatch (dispatch designated of a certain time after a predetermined time) requested from the customer terminal 2.

Here, explained is a case where customer requests dispatch request by hoping credit card payment for a taxi (transport) fare from the customer terminal 2. When customer operates the customer terminal 2 (the customer terminal 2-2 in this example) and sends a dispatch request (S1), a WEB server 31 of the management server 3 receives the dispatch request.

The customer terminal 2 gets location information thereof using acquisition function of GPS location information by communicate with the satellite 4 (S0). When making a dispatch request, customer inputs hoping for pick-up time, pick-up location and destination etc. to the customer terminal 2 and sends them to the management server 3, location information of the customer terminal 2 will be send at the same time. With communication with the customer terminal 2 and the management server 3, dispatch request information including a distance between pick-up location and destination, transport fare thereof etc. is displayed on a screen of the customer terminal 2. Detailed of screen of the customer terminal 2 will be described later.

When the WEB server 31 of the management server 3 receives the dispatch request, the dispatch request is registered on the database server 32. Then, the management server 3 creates a "passenger information list not dispatching" based on the dispatch request (S2).

The management server 3 demands a settlement confidence about card payment for an information of the customer terminal 2 and transport fare of the dispatch request to the intermediate treatment company server 5 (S3). Then, the intermediate treatment company server 5 demands confidence to the Card Company server 6 (S4). After that, the Card Company server 6 replies a confidence result to the intermediate treatment company server 5 (S5), and the intermediate treatment company server 5 notifies a confidence result to the management server 3 (S6).

When approved the confidence result, the management server 3 performs simultaneous transmission to notify the dispatch request to a plurality of driver's terminal 1 having a signed contract in an area of pickup destination area by using communication means such as a G-mail or push communication (S8). The driver's terminal 1 can receive a notification of the dispatch request.

Driver workers owning the driver's terminal 1 received the notification make to start the driver application downloaded to the driver's terminal 1, so that driver worker can browse the "passenger information list not dispatching". By browsing, the list is displayed on the driver's terminal screen. When driver worker wants to pick up a passenger (to be a customer), driver worker tapes a request column in the list displayed on the driver's terminal screen. Then, screen of the "reply notice of wish to pick up" will be displayed on the driver's terminal screen. Driver workers input scheduled time of pick-up on the terminal screen and tape a hoping for pick-up reply button displayed on the driver's terminal screen. Then, the hoping for pick-up reply can be sent to the management server 3 (S9). Detailed of screen of the driver's terminal 1 will be described later.

As the above, since the "passenger information list not dispatching" is made available for browsing on the screen of the driver's terminal 1, after browsing the "passenger information list not dispatching", driver worker can appropriately send hoping for pick-up to the management server 3 as a driver worker's will indication. Therefore, driver worker are free to spend their leisure time without having to prepare in advance to receive car dispatch request, can receive dispatch request without impossibility at their convenient time. Further, useless constraint time can be reduced. In addition, it is also possible to respond relatively quickly to hoping for pick-up from customer.

When driver worker send the "reply notice of wish to pick up" of the above step S9, driver's terminal 1 acquires location information thereof using acquisition function of GPS Polling location information by communicate with the satellite 4 (S7). The pinpoint location information of driver's terminal 1 at that time is registered in the management server 3 (S10). The management server 3 compares the acquired location information of the driver's terminal 1 with the location information of the customer terminal 2 and determines whether the driver's terminal 1 is suitable for pick-up, that is, whether the pick-up is actually possible. The operation after pick-up determination is the same as the operation in the case where the "reply notice of wish to pick up" is from a plurality of driver's terminal 1 which is described later, so the explanation here will be omitted.

FIG. 3A shows the "passenger information list not dispatching" created in the management server 3 by processing of the above step S9. FIG. 3B shows the "reply notice of wish to pick up" displayed on screen of the driver's terminal 1. By driver worker's access using the driver's terminal 1 to the management server 3, the driver worker can browse the "passenger information list not dispatching" as shown in FIG. 3A. In the displayed "passenger information list not dispatching", if there is a dispatch request which the driver worker desires, the driver worker tape a pick-up request column on the terminal screen, then the terminal screen as shown in FIG. 3B is displayed. In this case, No. (3) is tapped. Then driver worker input an arrival time (schedule) to a car dispatch request location and tap a reply button of hoping for pick-up on the terminal screen. Then driver worker can reply hoping for pick-up to the management server 3.

FIG. 4 shows a processing operation that the "reply notice of wish to pick up" is sent from a plurality of the driver's terminal 1 in the above step S9. In FIG. 4, since the operation from S0 to S10 is equivalent to FIG. 2, duplicate explanation will be omitted.

A plurality of driver worker starts up the driver application of the driver's terminal 1 and browses "passenger information list not dispatching". After that, if a plurality of driver worker would send the "reply notice of wish to pick up" to the management server 3 from the driver's terminals 1 (S9, S9) (in this case, from the driver's terminals 1-2, 1-3), the management server 3 notifies to the customer terminal 2-2 that there are a plurality of the "reply notice of wish to pick up" including an information of driver worker (S11, S11). Driver workers information may be included facial photograph of driver worker, business vehicle photograph, and pick-up performance and so on. Then, the customer decides which vehicle he want pick-up request among a plurality of the driver's terminal 1-2, 1-3 which notified the "reply notice of wish to pick up" on a displayed screen of the customer terminal 2-2. And the customer sends a decision of vehicle for pick-up request to the management server 3 (S12).

The management server 3 notifies a decision of vehicle for pick-up to the driver's terminal 1 (here 1-3) of which the customer decided as a pick-up request vehicle (S13). Then, the driver worker notifies a pickup consent notification to the management server 3 and the customer terminal 2-2 from the driver's terminal 1-3 which has been determined to be a pick-up vehicle (S14, S15). After that, driver worker notifies a notice of start of pick-up to the management server 3 and the customer terminal 2-2 from the driver's terminal 1-3. Then, the driver worker goes towards where to pick-up a car and let the customers on board, after arriving at the destination, notify transportation complete. During a time from the notice of start of pick-up to the transportation complete, location information of the driver's terminal 1-3 is registered continuously in the database server 32.

As described above, it becomes possible for the driver's terminal 1 to transmit the notice of start of pick-up to the management server 3 after receiving notification of decision of vehicle for pick-up notice. Then, the driver's terminal 1 sends continuously location information thereof to the management server 3 so that the location information is continuously registered in the management server 3.

From a time when the management server 3 received the notice of start of pick-up from the driver's terminal 1, the management server 3 judges that driver worker start to actual working hours. Then, the management server 3 calculates "remaining working hours" which can compensate a predetermined amount of wages based on (1) a sales amount being accounted with a transportation service completion of the pick-up, (2) a standard wage benefited to the driver worker, and (3) pick-up time for transportation service including a time before and after customer boarding. The calculated "remaining working hours" is accumulated.

As a result, driver worker obtains "remaining working hours". The driver's terminal 1 of driver worker obtained the "remaining working hours" sends continuing location information of the driver's terminal 1 to the management server 3 and makes register it in the management server 3. Then, the driver's terminal 1 can receive preferentially any dispatch requests of customer from the management server 3. Detailed of "remaining working hours" will be described later.

After notified notice of transportation completion by driver worker, in case that the driver worker want to continuing operate, the driver worker notify to start remaining working hour, then location information of the driver's terminal 1 is registered continuously in the management server 3. At a time for continuous registration of location information of the driver's terminal 1, the management server 3 can send any dispatch request information to the driver's terminal 1. When the driver worker notifies a notice of termination of remaining working hour, the registration of location information is finished. As above, the registration of location information is not impossible by other ways to make specified notification, and any dispatch request do not send to the driver's terminal 1 from the management server 3 at a time of location information is not continuously registered. Accordingly, it is possible to eliminate apparent wait by the driver worker.

<Riding Together Dispatch Request>

Figure 5:
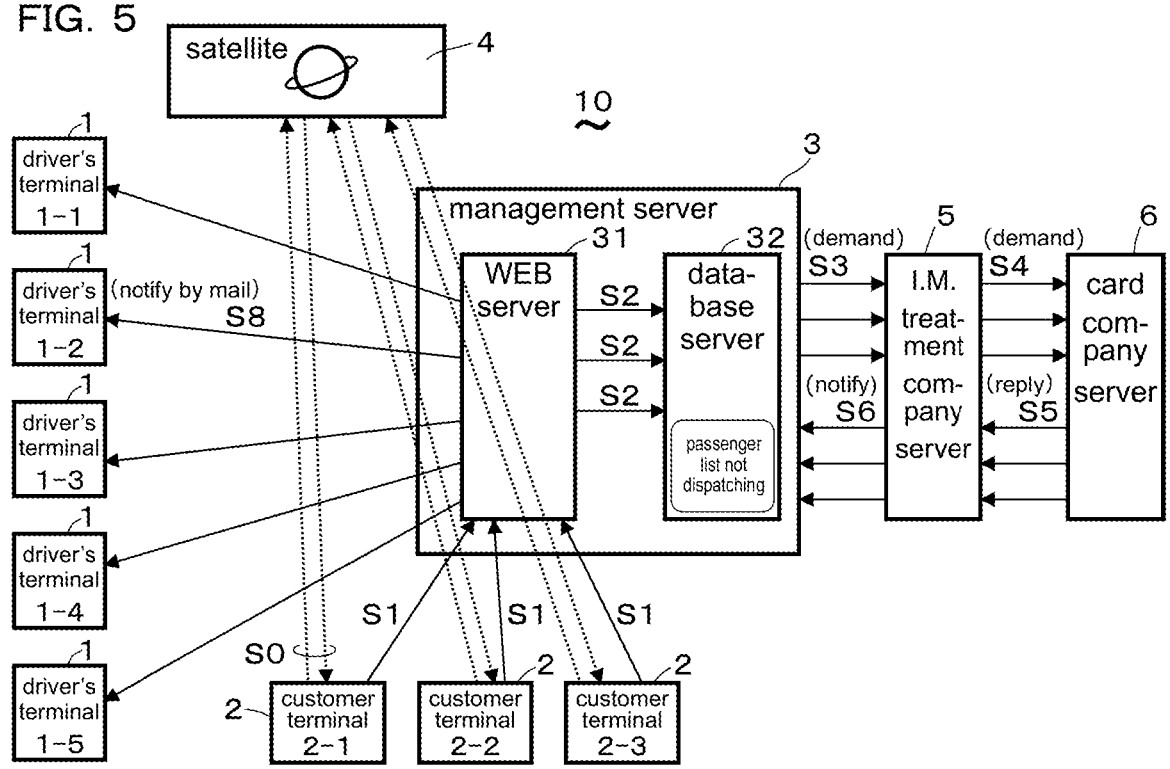
FIG. 5 is a view showing a processing operation when there is a "riding together dispatch request" from a plurality of customer terminal in the taxi dispatch control system.

FIG. 5 shows processing operation when there was "riding together dispatch request" from a plurality of the customer terminal 2. When a plurality of customers request ride together dispatch request, the customers input "riding together dispatch request information" on the "riding together dispatch request" screen of the customer terminal 2 (in this example, 2-1, 2-2, 2-3) using the customer application. The "riding together dispatch request" information is a pick-up grace time, pick-up location, destination and so on. The customers notify "riding together dispatch request" to the management server 3 by the customer terminal 2 (S1, S1, S1). The management server 3 registers the received requests in the database server 32 (S12, S12, S12). The displayed screen of the customer terminal 2 will be described later.

The management server 3 investigates whether or not a plurality of registered "riding together dispatch request" can combine to one dispatch request based on pick-up locations are within the same area and destination is within the same direction. At a time of being combined them, the management server 3 calculates transport fare for the riding together dispatch and asks for settlement confidence by credit card payment to the intermediate treatment company server 5 and the Card Company server 6 (S3, S4). If all of the settlement confidence is approval (S5, S6), the management server 3 creates a riding together dispatch passenger information list not dispatching" in the "passenger information list not dispatching" and registers the list. Thereafter, the management server 3 performs simultaneous transmission to notify the dispatch request to all of driver's terminal 1 having a signed contract in an area of pickup area by using communication means such as a G-mail or push communication (S8).

Figure 6:
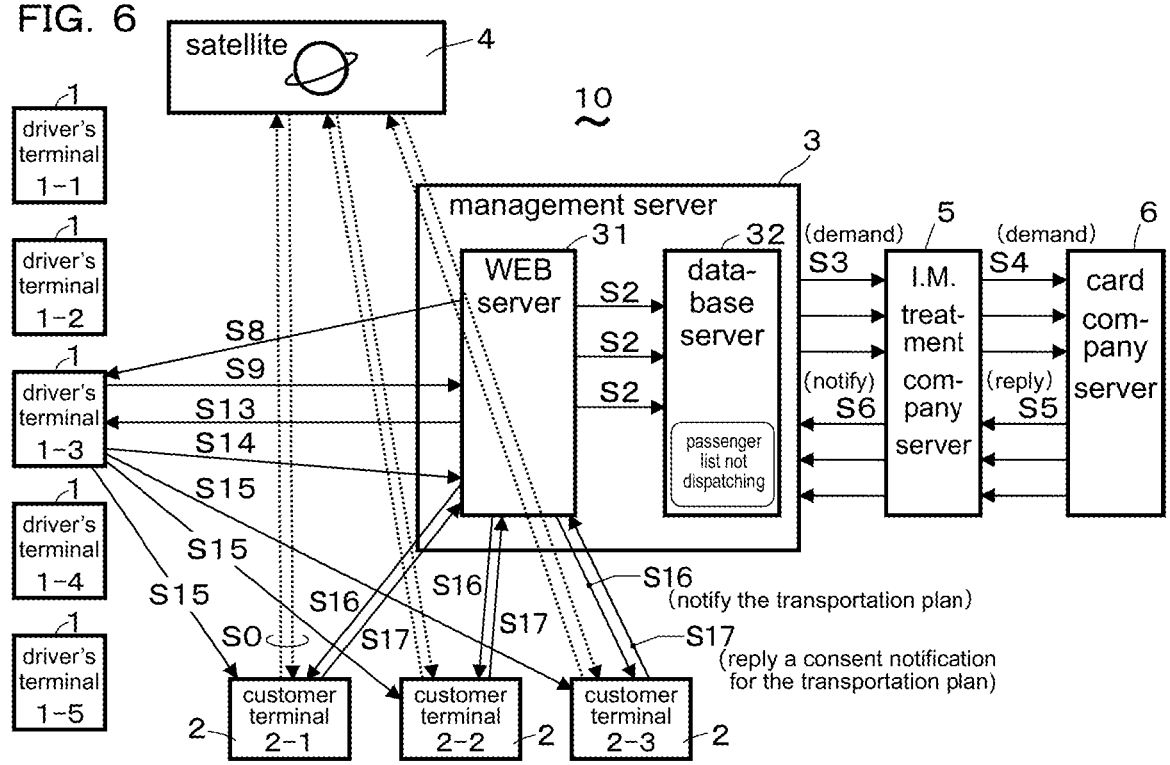
FIG. 6 is a view showing a processing operation when there is the "reply notice of wish to pick up" from the driver's terminal in case that the "riding together dispatch request" in the taxi dispatch control system.

FIG. 6 shows a processing operation when there was the "reply notice of wish to pick up" from the driver's terminal 1 after being notified the dispatch request to all of driver's terminal 1 as above description. When the driver's terminal 1 received the dispatch request notice (S8), the driver worker can browse a riding together dispatch passenger information list not dispatching" by the driver's terminal 1. Then, if the driver worker wishes to pick up the dispatch request, it is possible to send the "reply notice of wish to pick up" to the management server 3 from the driver's terminal 1 (in this case 1-3) (S9). The management server 3 received the reply from the driver's terminal 1 creates a transportation plan and notifies the transportation plan to the customer terminal 2-1, 2-2, 2-3 (S16). The transportation plan is included pick-up time, route, transport fare and so on.

The customer terminal 2-1, 2-2, 2-3 receives and displays the notified content. If the customer will consent to the notified content, the customer replies a consent notification for the transportation plan to the management server 3 from the customer terminal 2-1, 2-2, 2-3 (S17). The management server 3 judges whether or not all reply notices (the consent notification) are agreement. If those are Yes, the management server 3 sends a notice of picket decision to the driver's terminal 1-3 (S13). The driver's terminal 1-3 receives the notice, and the driver worker send a notice of pick-up consent to the management server 3 and the customer terminal 2-1, 2-2, 2-3 from the driver's terminal 1-3 (S14, S15, S15 and S15).

FIG. 7A shows a notice screen when customers send the "riding together dispatch request" from the customer terminal 2, FIG. 7B shows "riding together dispatch passenger information list not dispatching" created by the management server 3. Each customer input pickup grace time, pick-up location, destination on the notice screen of the "riding together dispatch request" shown in IG. 7A, tap a button of the "riding together dispatch request". Then, notice of the "riding together dispatch request" will send to the management server 3. Based on the received information, the management server 3 creates and registers the "riding together dispatch passenger information list not dispatching" as shown in FIG. 7B.

<Immediate Time (as Prompt as Possible) Dispatch Request>

Next, FIG. 8 shows a processing operation among the management server 3, the driver's terminal 1 and so on when there was an immediate time (as prompt as possible) dispatch request from the customer terminal 2. As to the immediate time dispatch request from the customer terminal 2, the management server 3 sends preferentially notice of dispatch request to the driver's terminal 1 of which driver worker are actual working hours and in remaining working hours. When the immediate time dispatch request from the customer terminal 2 (S1), location information of the customer terminal 2 is registered in the management server 3. And, acquired location information of the driver's terminal 1 of driver worker who obtain the remaining working hours and are continuing operate is registered continuously in the database server 32 of the management server 3 (S20, S21).

Then, the management server 3 can search in an instant the driver's terminal 1 which are in continuing operate in the vicinity of the customer terminal 2 sent the dispatch request. If there is driver's terminal 1 being judged possible to pick up, the management server 3 does credit card payment confidence of the customer terminal 2 to the intermediate treatment company server 5 (S3, S4, S5, S6). When the result is approval, the management server 3 sends a notice of dispatch request to the driver's terminal 1 that operates in the vicinity (S8). After then, when there is a notice of pick-up consent from the driver's terminal 1 to the management server 3, the management server 3 sends a notice of vehicle decision to the customer terminal 2 (S12). After that pick-up operation is the same with the above.

<Ordinal Dispatch Request>

FIGS. 9A, 9B and 9C shows a screen transition of the customer terminal 2 when the ordinal dispatch request is made described the above. When the customer requests the ordinal dispatch, the customer inputs or selects point of departure, destination, riding together dispatch request or not, charge rank etc. on a screen of the customer terminal 2 shown in FIG. 9A, then after taps a search button. Then, a route from a point of departure to a destination and charge are displayed on the screen of the customer terminal 2 as shown in FIG. 9B. Then, being tapped a decision button, transportation fare is displayed FIG. 9C. Next, the customer selects a request time zone for calling a vehicle and tapes a registration button. Then, information thereof and location information of the customer terminal 2 are sent to the management server 3. This dispatch request is registered in the "passenger information list not dispatching". And the management server 3 performs simultaneous transmission to notify the dispatch request to all of driver's terminal 1 in an area of pickup area by using a G-mail etc. The following is as described above. In a terminal screen shown in FIG. 9C, "immediate time dispatch request" is selected and tapped a registration button, the dispatch request is sent to a driver's terminal 1 which is continuing operate in remaining working hours.

<Riding Together Dispatch Request>

FIGS. 10A, 10B and 10C shows a screen transition of the "riding together dispatch request" on the customer terminal 2. When requesting riding together, the customer selects "riding together dispatch request" and taps a search button shown in FIG. 10A. Then, screen for entering a range of hoping for pick-up time and number of riding together people is displayed on the customer terminal 2 as shown in FIG. 10B. Being inputted those and tapped a decision button, confirmation terminal screen is displayed as shown in FIG. 10C. After confirmed, the customer taps a registration button. Then, the information is send to the management server 3 and registered. The management server 3 extracts other customer terminal 2 of which departure points is near and destination is the same direction among registered the "riding together dispatch request" and combines a plural of riding together dispatch request. The processing after combine is the same with the above.

Next, explained is calculation method for remaining working hours of driver worker and accumulate management of the remaining working hours. In this system, actual working hours for one pick-up working hour is grasped so that working hours does not become excessive. Notice of pick-up start is transmitted sent at a beginning of pick-up and notice of actual vehicle completion is transmitted at an actual vehicle completion. Time took for from the beginning of pick-up to the actual vehicle completion is to be actual working hours. It is to be actual working hours from a time of arrival to destination to a time for return home of driver worker. Actual revenue amount is deducted a predetermined expense from a sales amount got by actual working hours. Remaining working hours can be calculated by the following formula.

$$\{(\text{actual revenue amount})/(\text{Minimum wage by district})\} \times 60 \text{ minute} - (\text{actual working hours} + \text{time to return home})$$

Calculated remaining working hours is accumulative managed by the management server 3. When the driver worker acquiring the remaining working hours start the application of the driver's terminal 1 and send a notice for a starting of remaining working hours, continuing location information is registered in the management server 3. As a result, the driver's terminal 1 can preferentially receive a request notice from customer for the immediate time dispatch request. The management server 3 have a function of cumulative management of the remaining working hours and a function of notifying the remaining working hours to the driver's terminal 1.

In case of the immediate time dispatch request, if there is no business vehicle in the remaining working hours, the management server 3 performs simultaneous transmission to notify the dispatch request to all of driver's terminal 1 contracted driver worker in an area of pickup area by using a G-mail etc. just like that the ordinary dispatch request and the "riding together dispatch request" needing a grace time after a predetermined time. Even if it passes a predetermined time after the above notification, there is no "reply notice of wish to pick up" from the driver's terminal 1, then the management server 3 notifies the result that the dispatch request was not established to the customer terminal 2 and deletes the dispatch request from the "passenger information list not dispatching".

The present invention is not limited to the configuration of the above embodiment, and various modifications are possible. For example, in the above description, the embodiment in which the credit card payment is performed is shown, but the present invention is not limited thereto. The present invention may make appropriate changes so as to enable the management of the ride share and to contribute to the management of an appropriate working time according to the revenue amount of the driver worker.

This application is based upon and claims the benefit of priority from Japanese Patent Application No. 2018-064537 filed on Mar. 29, 2018, the entire contents of which are incorporated herein by reference.

The invention claimed is:

1. A taxi dispatch control system comprising:
a customer terminal possessed by a customer that is connectable to a network;
a driver's terminal mounted on a car driven by a driver worker that is connectable to the network; and
a management server controlled by a taxi managing company that provides and manages a dispatch service for the customer terminal using a customer application and for the driver's terminal using a driver application, the management server being connectable to the network;
wherein in the taxi dispatch control system,
the customer terminal is configured to send a dispatch request, including a pick-up location, a location information of the customer terminal acquired as GPS information and a destination, to the management server by the customer using the customer application,
the management server creates a list of passengers to be dispatched based on the received dispatch request designated to a certain time from the customer terminal and receives a notice of wish to pick up customer sent from the driver's terminal by the driver worker who browses the list of passengers to be dispatched,
the driver's terminal is configured so that the driver worker can browse the list of passengers to be dispatched displayed on the driver's terminal screen by using the driver application, and the driver worker can send the notice of wish to pick up customer as the wish of the driver worker after browsing the list of passengers to be dispatched, the driver's terminal is configured to send a location information of the driver's terminal acquired as GPS information at that time to the management server when sending the notice of wish to pick up customer,
the management server is configured to determine whether the driver's terminal is suitable for pick up based on the location information of the driver's terminal and the location information of the customer terminal,
the management server is configured to send a notice of a pick-up decision to the driver's terminal when the driver's terminal is determined suitable for pick-up and to register the location information to be continuously transmitted from the driver's terminal after receiving a notice of start of pick-up from the driver's terminal,
the driver's terminal becomes capable of transmitting the notice of start of pick-up to the management server after receiving the notice of the pick-up decision and is configured to continuously transmit its own location information to the management server for registration and thereafter to send a notice of the completion of transportation to the management server after picking up the customer and arriving at a destination,
the driver's terminal is configured to continuously send the location information of the driver's terminal to the management server during a time from the notice of start of pick-up to the notice of the completion of transportation,
the management server is configured to receive the notice of the completion of transportation that was transmitted from the driver's terminal when the driver arrives at the destination,
the management server is configured to determine that the driver worker has started working during actual working hours when receiving the notice of start of pick-up from the driver's terminal, to calculate and accumulate remaining working hours, and to notify the driver's terminal of the remaining working hours,
the management server immediately sends dispatch request information to the driver's terminal at a time for a continuous registration of the location information of the driver's terminal, and
when the driver's terminal of the driver worker who has acquired the remaining working hours sends a notice for starting of the remaining working hours to the management server, the management server continuously registers the location information of the driver's terminal so that the driver's terminal can preferentially receive a prompt pick-up request from the management server.

2. The taxi dispatch control system in accordance with claim 1, wherein
the management server is configured to calculate and accumulate the remaining working hours based on a sales amount recorded upon the completion of a transportation service by the driver worker, on a standard wage to be delivered to the driver worker, and on driving hours before and after picking up the customer during the transportation service, said remaining working hours being used to compensate for a predetermined wage, and
when the driver worker does not continue to work, the driver's terminal sends a notice of termination of remaining working hour to the management server to end the continuous registration of the location information of the driver's terminal.

* * * * *